Figure 1:
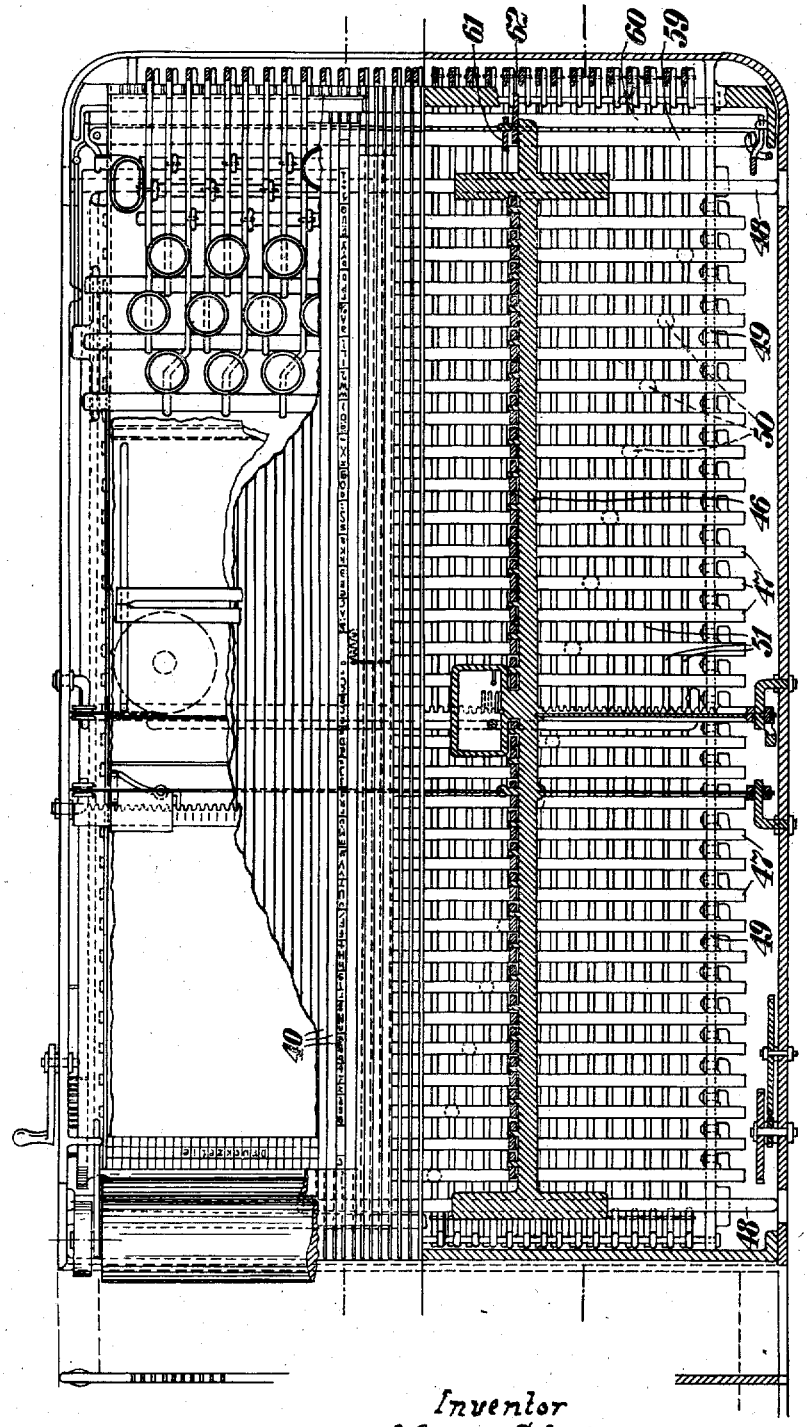

Jan. 20, 1925. Re. 15,985

W. SCHÄFFER

TYPEWRITER

Original Filed May 12, 1921 7 Sheets-Sheet 1

Inventor
Werner Schäffer
By Hauff & Woodward Attorneys

Jan. 20, 1925.

Re. 15,985

W. SCHÄFFER

TYPEWRITER

Original Filed May 12, 1921 7 Sheets-Sheet 2

Inventor
Werner Schäffer
By Hauff & Berland
Attorneys

Jan. 20, 1925. Re. 15,985

W. SCHÄFFER

TYPEWRITER

Original Filed May 12, 1921 7 Sheets-Sheet 3

Inventor
Werner Schäffer
By Hauff & Warland
Attorneys

Jan. 20, 1925. Re. 15,985

W. SCHÄFFER

TYPEWRITER

Original Filed May 12, 1921 7 Sheets-Sheet 4

Inventor
Werner Schäffer
By Haupt & Baerland
Attorneys

Jan. 20, 1925. Re. 15,985
W. SCHÄFFER
TYPEWRITER
Original Filed May 12, 1921 7 Sheets-Sheet 5
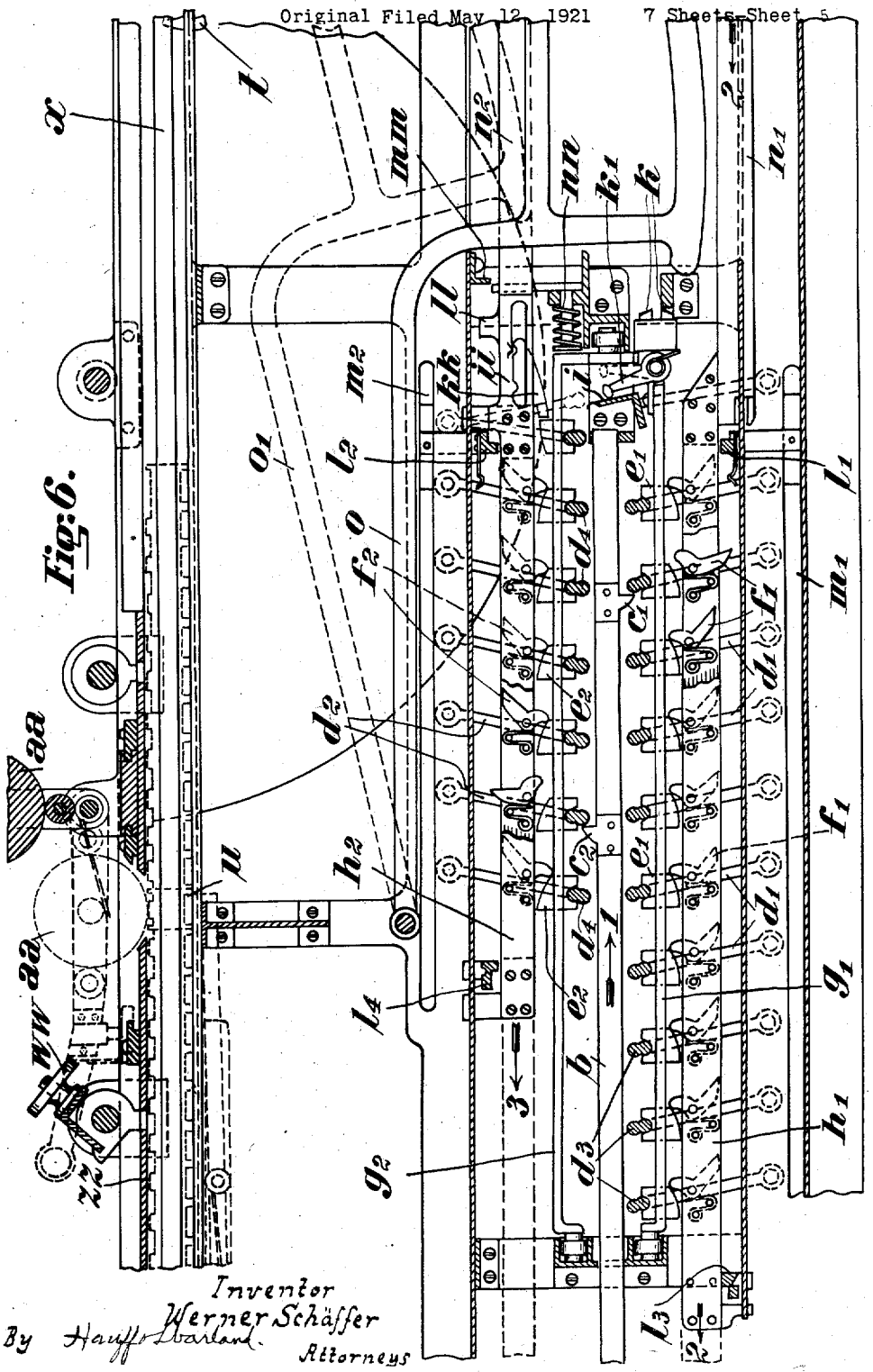
Inventor
Werner Schäffer
By Hauff & Boarland
Attorneys Jan. 20, 1925. Re. 15,985

W. SCHÄFFER

TYPEWRITER

Original Filed May 12, 1921 7 Sheets-Sheet 6

Inventor
Werner Schäffer
By Hauff & Berland
Attorneys

Jan. 20, 1925. Re. 15,985
W. SCHÄFFER
TYPEWRITER
Original Filed May 12, 1921 7 Sheets-Sheet 7
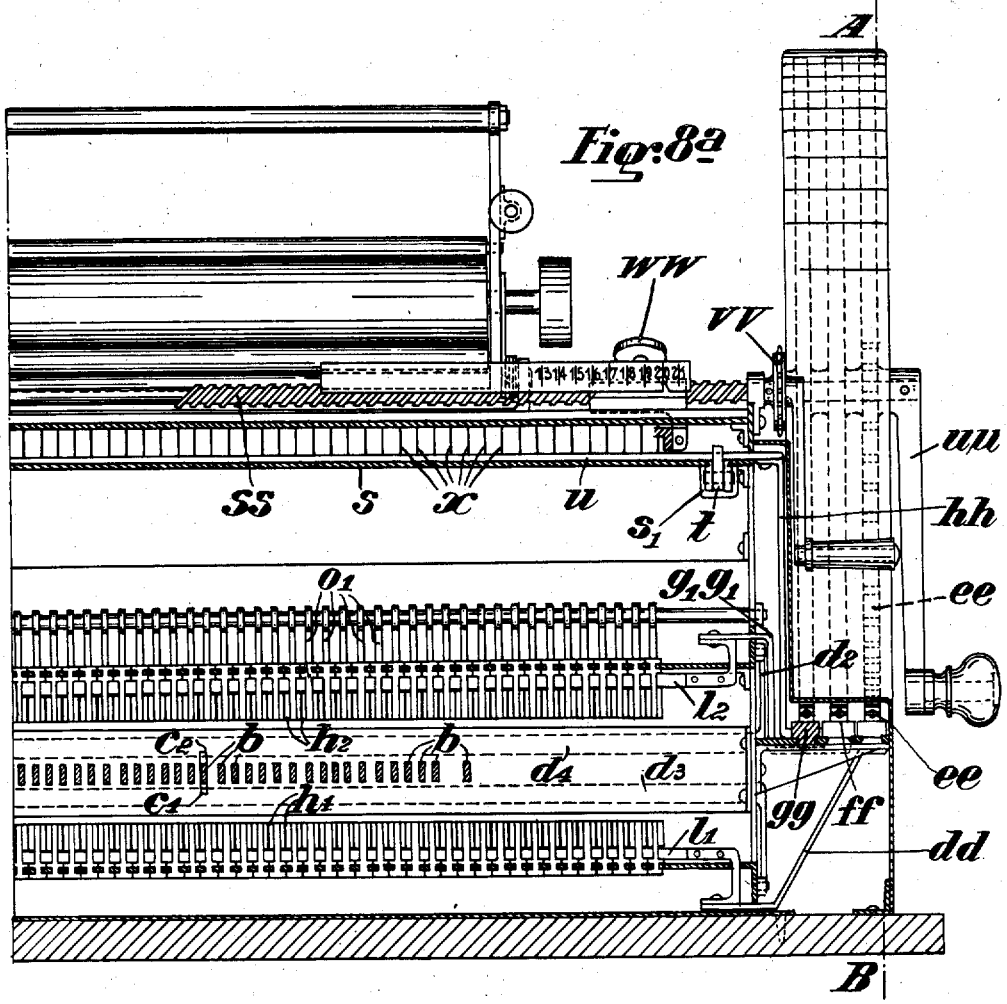
Fig:10.
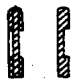
Fig:11.
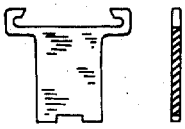
Inventor
Werner Schäffer
By Hauff & Warland
Attorneys Reissued Jan. 20, 1925.

Re. 15,985

UNITED STATES PATENT OFFICE.

WERNER SCHÄFFER, OF LAUPEN-BERN, SWITZERLAND, ASSIGNOR TO THE FIRM: POLYGRAPHISCHE GESELLSCHAFT, OF LAUPEN-BERN, SWITZERLAND.

TYPEWRITER.

Original No. 1,466,491, dated August 28, 1923, Serial No. 469,045, filed May 12, 1921. Application for reissue filed January 30, 1924. Serial No. 689,552.

*To all whom it may concern:*

Be it known that I, WERNER SCHÄFFER, a citizen of the German Empire, residing at Laupen-Bern, Switzerland, have invented certain new and useful Improvements in Typewriters, for which I have filed application in Germany, September 19, 1919, of which the following is a specification.

This invention relates in general to typewriters. Its object is to produce a machine in which a number of sets of types, or type bars arranged side by side, are brought into the printing position by parts provided with movable projections and arranged to be shifted in the direction of their length, the said projections preferably consisting of pivoted arms or dogs. The number of longitudinally movable parts with pivoted dogs is preferably equal to the largest number of characters occurring in one line of writing. The pivoted dogs are first rocked into gripping positions by keys and a device that travels through the machine, and they are then brought into line by a bar or the like that extends through the machine in a transverse direction. The restoring of the dogs of the longitudinally shifted parts into their normal positions may be accomplished by a single bar extending parallel to the bar that brings the dogs into line.

Another feature of the invention consists in the fact that the types are arranged on bars of breadths differing in accordance with the various breadths of the different letters or characters. This may be accomplished by arranging types of approximately equal widths on a short bar which may be of equal width throughout its length and which, in conjunction with other bars of different widths, forms a complete set of types.

In accordance with the invention the type bars are so arranged that, when they have been brought into their printing positions, they may be moved laterally so as to enable spaces to be inserted between them.

In a machine having the types of a set arranged on a number of bars the letters are brought into their printing positions by a magaizne, in which the bars of a set of types are placed, being moved into a position in which the desired type bar may be shifted out of its magazine into the printing position, the extent to which the bar is moved out to cause the proper one of its characters to be printed being controlled by a second motion. The various magazines are arranged side by side and when their proper type bars have all been pushed out to the proper extent the desired types on the various bars will all be in line and in the printing position.

The aforementioned device that travels through the machine is preferably arranged to move one step each time a key is struck, each key being adapted to affect the stepping mechanism whenever it is depressed.

The short type bars, after they have been moved out of their magazines, may be locked, as by means engaging with their lower surfaces, and they may be shifted into a printing position in which the line length adjusting device may be located which determines the length of a line. When the length of the line has been adjusted, spaces are inserted between the various words in the manner well known in printing.

In the space between the magazines and the printing position the type bars are preferably guided in channels formed by parallel resilient metal strips which are fixed at the magazines at definite distances apart from each other, but are laterally movable at the position of printing.

Two constructional forms of the invention are shown in the drawing in Figs. 1 to 4 and Figs. 5 to 11 respectively.

Figure 2:
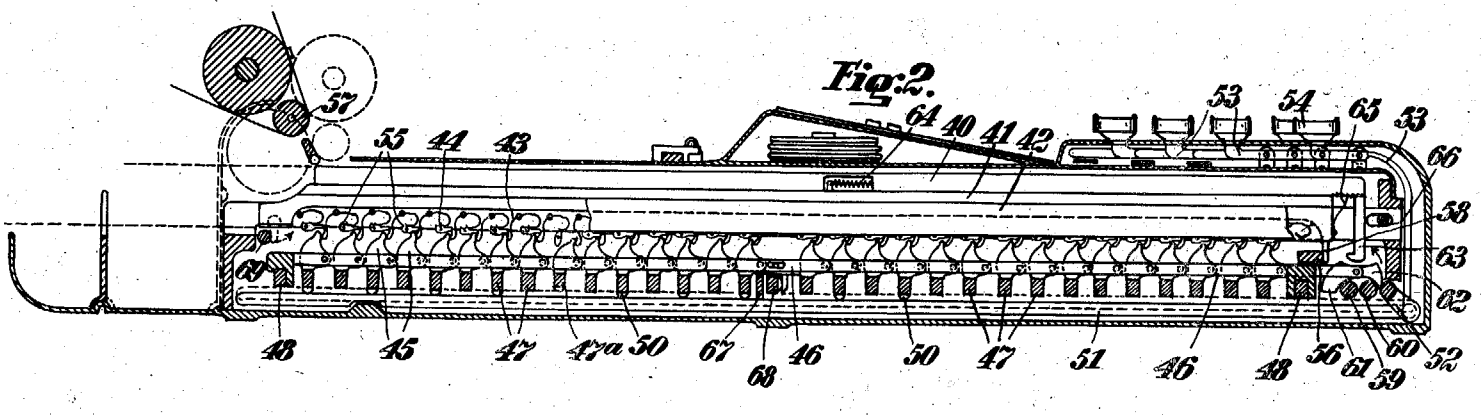
Figure 3:
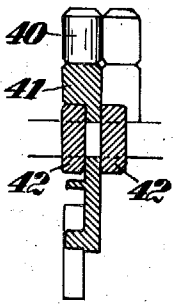

Fig. 1 being a plan view, partly in section, of a machine in which each type bar carries a complete set of types, Fig. 2 being a sectional elevation showing amongst other parts the dog shifting cam bar which travels through the machine, Fig. 3 a sectional view of a type carrier consisting of a carrier bar and a type bar adapted to be shifted lengthwise thereon.

Figure 4:
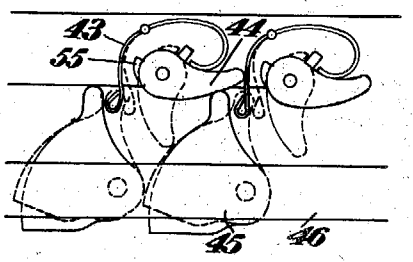
Figure 5:
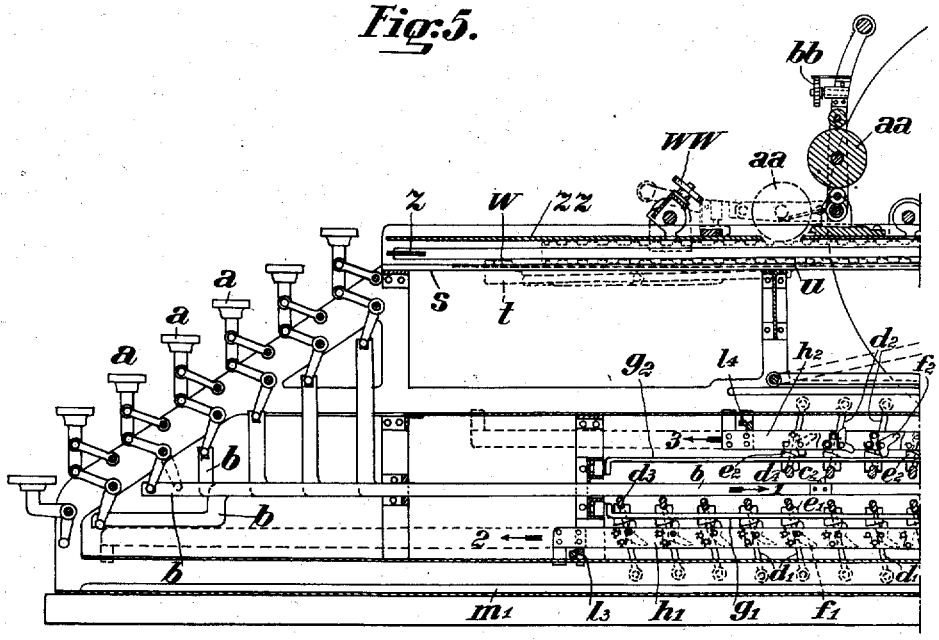

Fig. 4 is an enlarged view of a part of a type carrier or bar with its dog, and of a corresponding part a dog-selecting cam bar, Fig. 5 is a longitudinal sectional elevation of a modified machine with type bar magazine, Fig. 5[a] is a similar view of the same.

Figure 7:
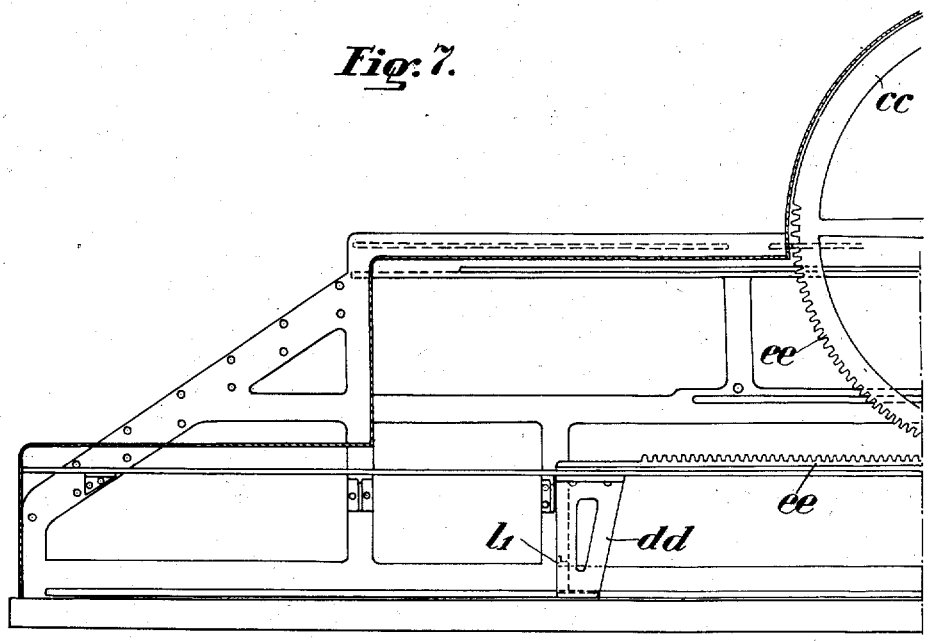
Figure 5A:
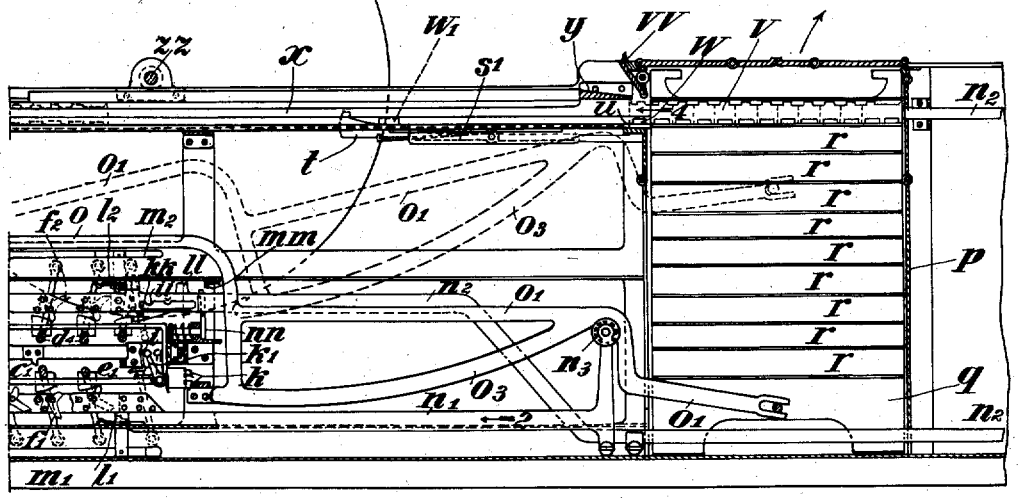
Figure 7A:
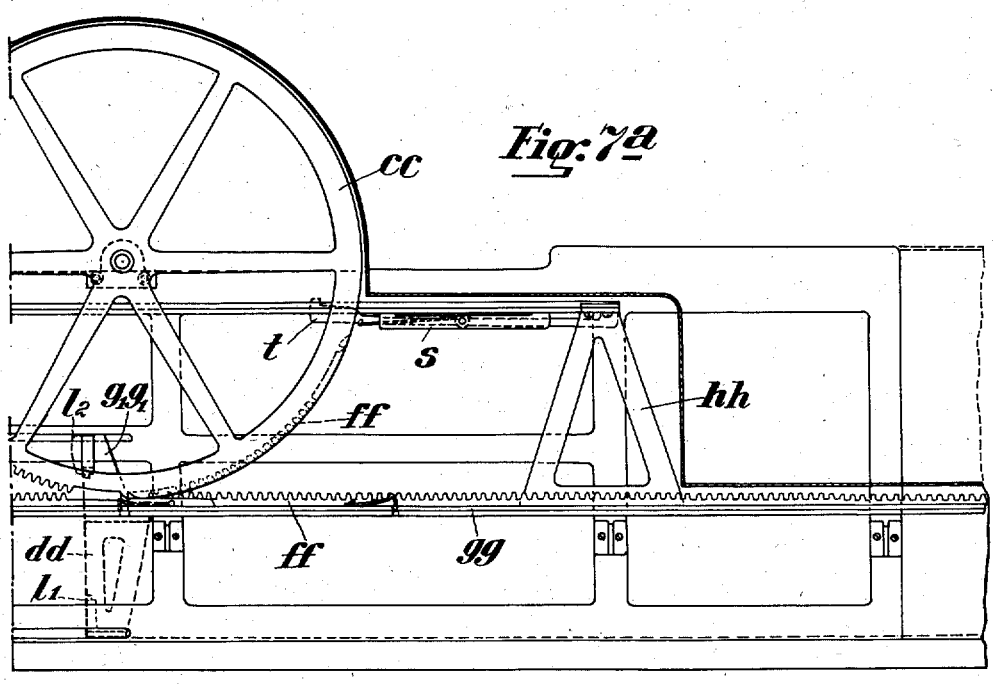
Figure 8:
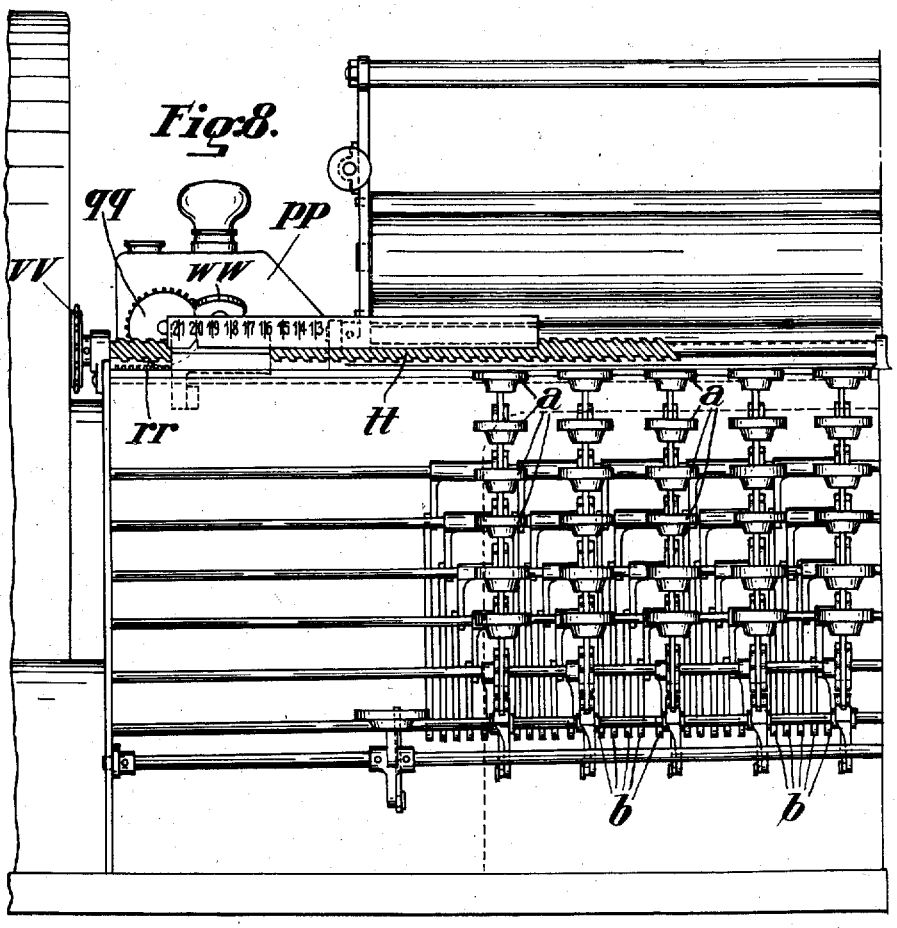
Figure 9:
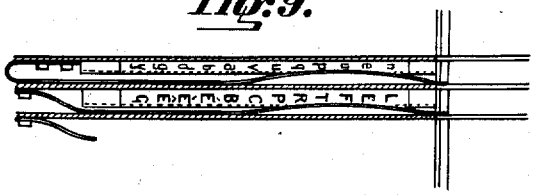

Fig. 6 is partly a front elevation and partly a transverse section of the machine of Fig. 5, Fig. 7 is a side view of the driving wheel and racks of the same machine, Fig. 7ª is a similar view of the same, Fig. 8 is an enlarged fragmentary longitudinal sectional elevation, Fig. 8ª is a similar view of the same, Fig. 9 is a fragmentary plan sectional view of the typebar magazine, Fig. 10 is a cross section of the type bars and Fig. 11 represents a front view and a section respectively of a space.

The machine shown in Figs. 1 to 4 comprises a number of type bars 40 with types on their upper surfaces. Arranged beneath the type bars are rods 42 carrying pivoted dogs 44 which may be kept in their normal positions by springs 43. A device consisting of a bar 46 extending lengthwise through the machine, and equipped with cams 45 which act upon the springs 43 so as to allow the dogs 44 to swing down, is adapted to travel in a transverse direction (from bottom to top and vice versa in Fig. 1) through the machine. Arranged beneath the device 46 that carries the cams 45 (Fig. 2) and travels through the machine, are rods 47 extending crosswise through the machine which are adapted to be actuated, as shown at 47ª (Fig. 2), through projections 50 by rods 51 moved or lifted by the keys of the machine.

If a rod 51 linked to a key 54 is shifted and thus lifted, this will result in the particular rod 47, whose projection 50 (Figs. 1 and 2) registers with the rod 51 being lifted also. By this means the cam 45 associated with the lifted cross bar 47ª, is swung up so as to act upon the particular spring 43 beneath which the cam 45 lies at that moment and the spring 43 is thus caused to release the dog 44 which it has been holding up. The device 46 with the cams 45 is arranged to travel on the rods 48 and is shifted on one step each time a key is struck, this step-by-step movement being produced by a stepping device of any known type associated with a rack and actuated by a universal bar 67 which, in turn, is adapted to be actuated by every key. When the device 46 has passed through the whole machine and arrived at its outmost position near the flank of the machine a rod 56 is enabled to move to the left in Fig. 2 and to bring the dropped dogs 44 of all the type bars into alignment; when the type bars have been thus moved the printing operation can be carried out by the platen 57 being made to strike upon the row of types that is presented to it by the type bars.

The type carriers may consist of two bars 40 and 41 (as shown more clearly in Fig. 3) the upper bar or type bar 40 being arranged to move lengthwise a certain distance upon the lower bar 41. By this arrangement the type bars may be arranged to have more types than there are type selecting cams 43 on the common dog controller that travels through the machine, for by shift keys the type bars 40 may be displaced upon the bars 41 so as to cause a plurality of different types on each type bar to correspond to each type selecting cam. The shift motion of the type bars may be effected with the aid of an arm 63 (Fig. 2) projecting downward from the end of each type bar 40 and adapted to be moved the one way or the other by transverse rods 59 which swing one arm 61 or the other 62 of a two armed lever upward about its middle pivot when a shift key corresponding to the rod 59 or a second shift key corresponding to the rod 60 is depressed. The two armed lever 61, 62 is pivoted on the end of the common dog controller 46 that travels through the machine. A spring detent 65 is adapted to retain the type bar 40 in the position to which it is shifted. A common restoring rod 66 is provided which restores the shifted type bar to its normal position on its carrier bar 41. A spring 64 may be arranged to assist in restoring the type bar.

In Figs. 5 to 11 a typewriter is illustrated in which the setting of the type bars and of type bar magazines is effected by devices similar to those used for setting the type bars in the machine described above.

In Figs. 5, 5ª and 6 the keys $a$ act upon rods $b$ provided with one or more projections or strikers $c_1$, $c_2$. The strikers $c_1$, $c_2$ affect levers $d_1$, $d_2$, these levers being arranged in pairs, the two levers of each pair being arranged at opposite sides of the machine and each pair being interconnected by transverse rods, as $d_3$, $d_4$, that act upon sliding members or riders $e_1$, $e_2$. The riders $e_1$, $e_2$ are slidably mounted upon a device that travels in a transverse direction through the machine and comprise the horizontal bars $g_1$, $g_2$ provided at their left ends, Fig. 8, with rolls and connected at their right ends by a vertical bar equipped with a third roll. The riders $e_1$, $e_2$ act upon elbows or dogs $f_1$, $f_2$ each adapted to be held by springs in either of two positions. The dogs $f_1$, $f_2$ are mounted upon type selecting rods $h_1$ and type bar selecting rods $h_2$, whose number is equal to the largest number of letters that may occur in a single line, and which are adapted to be moved in the directions of their lengths.

The end of each rod $b$ acts upon a bar $i$ which extends crosswise through the entire machine and controls a stepping device $k$ which may consist of a rack and a suitable escapement.

The horizontal bars or carriers $g_1$, $g_2$ of the riders $e_1$, $e_2$ which form a single device as described are pulled step by step through the machine by any suitable kind of draught member (not shown). The tranverse bar $i$ acts upon the lever $k$, which is preferably arranged at the middle of the device $g_1$, $g_2$ and controls the escapement of the stepping mechanism.

The operation of the parts described up to this point is as follows:

On the depression of a key $a$ the associated rod $b$ is moved in the direction of the arrow 1 and its strikers $c_1$, $c_2$, each strike against a transverse rod $d_3$, $d_4$ which are connected to riders $e_1$, $e_2$ on the device that travels through the machine and which, when they are shifted each cause a dog $f_1$ and $f_2$ to be tilted, the dog effected by $e$, being tilted down and that effected by $c_2$ being tilted up as shown more clearly in Fig. 8. At the same time the rod $b$ moved by the depressed key acts on the bar $i$ which effects the escapement causing the traveller $g_1$, $g_2$ with its riders $e_1$, $e_2$ to be shifted on one step so as to register with the next row of dogs $f_1$, $f_2$.

The dogs $f_1$, $f_2$ when tilted, are brought into the paths of transverse pushing bars $l_1$, $l_2$ guided in long slots $m_1$, $m_2$ located at the sides of the machine. The dog carriers or bars $h$, are connected to a bar $n_1$ equipped with a roll $n_3$ at the top of a post. When the bar $n_1$ is moved in the direction of the arrow 2 its roll $n_3$ rolls along the bottom curved edge of a lever $O_1$ and according to extent of the movement of the bar $n_1$ the lever $O_1$ will be raised more or less, one position into which it may be lifted being indicated in Fig. 5 by broken lines. The movement of the strip metal dog carriers $h_1$, and of the bars or strips $n$, joined to them is effected with the aid of a transverse bar $l_1$, which, when moved towards the left will engage with a downwardly tilted dog and may push the strip $h_1$ towards the left, its maximum movement in this direction being indicated by broken lines in Fig. 5.

The lever $O_1$ cooperates with a bottom plate $q$ arranged in a magazine box $p$ and adapted to slide in lateral guide members. Arranged above the plate $q$ are a number of type bars which, in their totality, form a complete set of types. Each type bar is placed in a separate compartment $r$ in a magazine. A side view of the type bar $v$ in the top compartment is shown in Fig. 5. With the aid of the parts $f_1$, $l_1$, $h_1$, $n_1$, $o_1$, the bottom plate $q$ and its superimposed magazine may be lifted to any one of a number of definite levels.

Connected with the metal strips or dog carriers $h_2$ are bars $n_2$ which may be shifted with the aid of upwardly tilted dogs $f_2$ and the transverse bar $l^2$ in the direction of the arrow 3. The rods $n^2$ extend obliquely downward, then horizontally towards the right and then upward and finally towards the left, so that their free ends abut upon the right ends of the type bars as shown in Fig. 5. Hence, when a rod $n_2$ is shifted with the dog carrier $h_2$ towards the left, the type bar $v$ will be pushed out by the rod $n_2$ to an extent which corresponds to the particular dog $f_2$ engaged by the transverse bar $l_2$.

The type bars glide forward upon a smooth plate $s$ which extends from the one side of the machine to the other and from the inner boundary of the magazine to the inner boundary of the keyboard. Adapted to slide along the two lateral margins or edges of the plate $s$ are two slides $s'$ each of which has a pivoted rocking lever $t$ the left end of which is normally kept raised by a spring as shown in Fig. 5[a]. The rocking levers $t$ of the two lateral slides are interconnected at their rear ends by a transverse bar $u$ which thus normally extends from one rear corner of the plate $s$ to the other. The bar $u$ is adapted to enter into notches in the bottom surfaces of the typebars $v$ and to thus interlock these bars after they have been pushed forward out of their magazines. To interlock the typebars the rear ends of the levers $t$ with their transverse bar $u$ must be rocked upward and to this end the front ends of the levers $t$ are pushed downward. This is accomplished by means of a transverse bar $w$ which is adapted to be pushed from the left border of the magazine towards the front end of the machine. This bar $w$ can be pushed into the position $w^1$, indicated by broken lines in Fig. 5[a], without affecting the levers $t$, but when it is moved further the bar $w$ swings the front ends of the levers $t$ downward so that the bar $u$ is rocked upward into notches in the bottom of the typebars and these bars are interlocked and thus prevented from shifting relatively to each other. On the bar $w$ being moved further towards the keyboard it strikes against an upwardly extending catch at the left end of each lever $t$ and then takes the slides $s'$ together with the interlocked typebars along with it. Its motion continues until it reaches the position indicated by broken lines near the front end of the plate $s$ when the line of types to be printed will be beneath the platen as shown by broken lines, this being the printing position; the type bars slide beneath the plate $zz$.

Whilst travelling from the magazines to the printing position the typebars are guided by resilient strips $x$ whose right ends are fixed in a holder $y$ which keeps them at certain distances apart and whose other ends are attached to a laterally movable transverse bar $z$.

When a row of types has been brought into the printing position it is inked by a known form of inking device $pp$ equipped with a toothed wheel $qq$ that meshes with a rack $rr$, or by an ink ribbon or the like. Before the inking operation takes place the typebars are moved close together by a line-length adjusting device which may consist of pushing members or carriers (one at each side of the machine) fitted on screw spindles *ss*, *tt* so as to be moved inwards to points indicated by manually adjusted screws *ww* when the spindles are turned by means of sprocket wheels *vv* (Fig. 6). The spaces between the words are then regulated as in type setting machines by inserting spacing members in the well known manner. The spacing members, as shown in Fig. 11 are preferably provided with shoulders which enable them to be more readily inserted or pulled out. The typebars are preferably furnished with lateral grooves as shown in Fig. 10 to make room for the elastic guiding strips *x*. A line of types is printed by striking it with the platen *aa*. It will be found advantageous to provide guideways for the inking device and also for the paper drum so as to enable the latter to be replaced. It may be found advantageous in some cases to provide a limiting device *bb* (Fig. 5) for determining the extent to which the platen swings down.

The travelling motions executed by the various sliding parts of the parts of the machine are derived from a wheel *cc* (Figs. 7 and 7[a]) equipped with a crank handle *uu*. When the wheel *cc* is turned a toothed segment *ee* moves a rack *ee* and the transverse bar $l_1$ is connected to it by a vertical connecting member *dd*. A second toothed segment *ff* of the wheel moves a corresponding rack *ff* and the transverse bar $l_2$ which is connected to the rack *ff* by the vertical connecting member $g_1$ $g_1$ (Fig. 6). The two toothed segments *ee* and *ff* are, of course, arranged side by side or axially displaced with respect to each other on the wheel, so that each segment meshes only with the rack to which it corresponds. This also applies to another segment which moves a third rack *gg* connected by the vertical trestle *hh* to the transverse bar *w* so as to transmit its motion to it. The racks *ff* and *gg* may be moved singly or simultaneously. In the latter case the bar *w* and the typebar pushers $n_2$ move together. All bars, rods and other parts that move along straight lines will preferably be arranged to travel on rolls in order to reduce friction. Spring catches are arranged on the bars $l_1$ and $l_2$ (Fig. 8[a]), these catches being adapted to click into depressions in transverse bars $l_3$ and $l_4$ so as to temporarily couple them to $l_1$ and $l_2$. When the bars $l_1$ and $l_2$ move back they then take the bars $l_3$ and $l_4$, along with them and these bars $l_3$ and $l_4$ restore the dogs $f_1$, $f_2$ to their normal position. The arrangement may be such that when the bars $l_3$ and $l_4$ have performed this function they will strike against stops which prevent their further movement, and cause them to be detached from the bar $l_1$ and $l_2$ whose backward motion continues until they reach their normal positions.

The connection between the rods $n_2$ and the dog holders $h_2$ is preferably such that the rod $n_2$ may be pushed back from the dog holder $h_2$ to a certain distance by a striker knocking against a projection *kk* upon the depression of a shift key. A spring connecting member *ii*, which ordinarily engages with the rear depression in a connecting piece belonging to the rod $n_2$ is caused to click into another depression and the rod $n_2$, which is thus moved further back, will, when it is moved forward to push out a typebar, strike the typebar somewhat later than it would have done if its coupling member had not been shifted back as described. By this means the selecting rods with 6 dogs $f_2$ will suffice for the selection of 12 different types on the typebars.

The rods $n_2$ are provided with upwardly extending projections *ll* which strike against a fixed bar *mm* when the dog carrier $h_2$ and its associated bar $n_2$ is returned to its normal position. The spring *ii* is then dislodged from the left recess. It is restored to its right hand recess by means of a spring member *nn* which is tensioned when the bar $n_2$ is moved with the dog carrier to the right, and which shifts the bar $n_2$ back towards the left as soon as the spring *ii* is dislodged from the left recess in the coupling member of $n_2$.

Fig. 9 is a fragmentary plan sectional view of the typebar magazine showing the arrangement of lateral springs for firmly holding the typebars in position in the magazine so as to prevent them from vibrating therein. In this figure the magazine is shown with the side through which the typebars are pushed out turned towards the right instead of the left as in Fig. 5[a].

I claim:—

1. In a writing machine, a shifting device, types, type moving members each adapted to move a number of the said types into different positions, and a number of engaging members attached to each of the said moving members and each adapted to engage singly with the shifting device, whereby the shifting device is caused to shift the type moving member into different positions.

2. In a writing machine, types, a shifting device, longitudinally movable type moving bars each adapted to move a number of the said types into different positions, and a number of engaging members attached to each of the said moving bars and each adapted to engage singly with the shifting device, whereby the shifting device is caused to shift the type moving member into different positions.

3. In a writing machine, a shifting device, types, type moving members each adapted to move a number of the said types into different positions, and a number of swinging dogs, attached to each of the said moving members and each adapted to engage singly with the shifting device, whereby the shifting device is caused to shift the type moving member into different positions.

4. In a writing machine, a shifting device, types, type moving members each adapted to move a number of the said types into different positions, and a number of swinging dogs attached to each of the said moving members and each adapted to engage singly with the shifting device, whereby the shifting device is caused to shift the type moving member into different positions, the number of the said type moving members being equal to the highest number of characters occurring in one line.

5. In a writing machine, a shifting device, types, type moving members each adapted to move a number of the said types into different positions, a number of engaging members attached to each of the said moving members and each adapted to engage singly with the shifting device, whereby the shifting device is caused to shift the type moving member into different positions, and means for bringing any engaging member into its engaging position and adapted to travel through the machine from one type moving member to another.

6. In a writing machine, types, a shifting device, longitudinally movable type moving bars each adapted to move a number of the said types into different positions, a number of engaging members attached to each of the said moving members and each adapted to engage singly with the shifting device, whereby the shifting device is caused to shift the type moving member into different positions, and means for bringing any engaging member into its engaging position and adapted to travel through the machine from one type moving bar to another.

7. In a writing machine, types, longitudinally movable type moving bars, a number of engaging members attached to each said bar, keys, means controlled by the said keys and adapted to bring any said engaged member into its engaging position, said means being common to all the said bars and adapted to pass from bar to bar through the machine, and a shifting device for shifting into alignment all the engaging members which have been brought into their engaging position.

8. In a writing machine, types, longitudinally movable type-moving bars, a number of swinging dogs on each of said bars, keys, means controlled by the said keys and adapted to bring any said dog into an operative position, said means being common to all the said bars and adapted to pass from bar to bar through the machine, and a shifting device for shifting into alignment all the dogs which have been brought into their operative position.

9. In a writing machine, types, longitudinally movable type-moving bars, a number of swinging dogs on each said bar, keys, means controlled by the said keys and adapted to bring any said dog into an operative position, said means being common to all the said bars and adapted to pass from bar to bar through the machine, and a transverse bar extending through the machine and adapted to shift into alignment all the dogs which have been brought into their operative position.

10. In a writing machine, longitudinally and laterally movable type bars, longitudinally movable rods for setting the type bars, a number of swinging dogs mounted on each said rod, keys, means controlled by the said keys and adapted to bring any said dog into an operative position, said means being common to all the said rods, and adapted to pass from rod to rod through the machine, a transverse bar extending through the machine and adapted to shift into alignment all the dogs which have been brought into their operative positions, and spacing members adapted to be inserted between the laterally movable type bars.

11. In a writing machine, longitudinally and laterally movable type bars of different breadths according to the breadths of their types, longitudinally movable rods for setting the type bars, a number of swinging dogs mounted on each said rod, keys, means controlled by the said keys and adapted to bring any said dog into an operative position, said means being common to all the said rods and adapted to pass from rod to rod through the machine and to shift into alignment all the dogs which have been brought into their operative positions, and spacing members adapted to be inserted between the laterally movable type bars.

12. In a writing machine, a plurality of sets of type, each set being arranged upon a number of longitudinally and laterally movable typebars, movable rods for setting the type bars, a number of swinging dogs mounted on each said rod, keys, means controlled by the said keys and adapted to bring any said dog into an operative position, said means being common to all the said rods and adapted to pass from rod to rod through the machine, a transverse bar extending through the machine and adapted to shift into alignment all the dogs which have been brought into their operative positions, and spacing members adapted to be inserted between the laterally movable typebars.

13. In a writing machine, movable magazines, a number of typebars in each magazine, a first row of longitudinally movable bars for moving the magazines into certain positions, and a second row of longitudinally movable bars for shifting typebars out of the said magazines.

14. In a writing machine, movable magazines, a number of typebars in each magazine, a first row of longitudinally movable bars for moving the magazines into certain positions, a second row of longitudinally movable bars for shifting typebars out of the said magazines, means for moving the shifted typebars into the printing position, and means for interlocking the typebars against relative longitudinal movements when they are in a printing position.

15. In a writing machine, types, longitudinally movable type moving bars, a number of engaging members attached to each said bar, depressible keys, means controlled by the said keys and adapted to bring any said engaging member into its engaging position, said means being common to all the said bars and adapted to pass from one bar to another at each depression of a said key, and a shifting device for shifting into alignment all the engaging members which have been brought into their engaging position.

16. In a writing machine, a shifting device, types, type moving members each adapted to move a number of the said types into different positions, a number of engaging members attached to each of the said moving members and each adapted to engage singly with the shifting device, whereby the shifting device is caused to shift the type moving member into different positions, means for bringing any engaging member into its engaging position and adapted to travel through the machine from one type moving member to another, and a common restoring means for restoring all the engaging members into their normal positions.

17. In a writing machine, movable magazines, typebars with blank spaces in the magazines, a first row of longitudinally movable bars for moving the magazines into certain positions, a second row of longitudinally movable bars for shifting typebars out of the said magazines, letter keys, blank keys, and shifting means for shifting parts of typebars that correspond to operated letter keys and blank keys into alignment and into a printing position.

18. In a writing machine, types, longitudinally movable type moving bars, a number of engaging members attached to each said bar, keys, means controlled by the said keys and adapted to bring any said engaged member into its engaging position, said means being common to all the said bars and adapted to pass from bar to bar through the machine, a shifting device for shifting into alignment all the engaging members which have been brought into their engaging position and for simultaneously shifting a row of types into a printing position, an inking device and a guideway for guiding the inking device, along the row of types located in the printing position.

19. In a writing machine, movable magazines, a number of typebars in each magazine, a first row of longitudinally movable bars for moving the magazines into certain positions, a second row of longitudinally movable bars for shifting typebars out of the said magazines, a platen adapted to be pressed onto the typebars, and guide members for guiding the typebars when moved out of the magazines, the said guide members being movable at the position where the platen is pressed onto the typebars.

20. In a writing machine, longitudinally and laterally movable typebars each having a row of fixed characters, means for bringing any type on any said typebars into a printing position, a device for adjusting the length of the line of type in the printing position, spaces adapted to be inserted between the words in a line, a platen, and means for pressing the platen against the said line of types.

21. In a writing machine, typebars, means for moving any desired types on the different typebars into alignment and into a printing position, guide members for guiding the typebars, said guide members being laterally movable at the printing position, and a device for adjusting the length of the line of type in the printing position, said device being adapted to receive any number of guide members that exceeds the number of typebars shifted into the printing position.

22. In a writing machine, typebars, means for moving any desired types on the different typebars into alignment and into a printing position, guide strips for guiding the typebars, said guide strips being laterally movable at the printing position, and lateral recesses in the typebars for the reception of the guide strips.

23. In a writing machine longitudinally movable typebars, type moving members with dogs to move any typebars into the printing position, means for bringing any said dogs into an operative position, a moving member for moving any said dog, a motion transferring member for transferring the movement of the dog to its associated typebar, a shift-key and a shifting member for changing the relative positions of the dogs, the motion-transferring member and its typebar when the shift-key is operated, whereby the type of the typebar, that is brought into the printing position is made to differ from that which is brought into the printing position when the shift-key is not operated.

24. In a writing machine, types, longitudinally movable type-moving bars, a number of engaging members movably mounted on each said bar, a cam bar adapted to travel through the machine and equipped with cams for operating the said engaging members, controlling bars extending through the machine and each adapted to bring a certain engaging member into its engaging position, keys for operating the said controlling bars, and a common shifting member adapted to engage with the operated engaging members and to shift their type-moving bars into desired positions.

25. In a writing machine, types, longitudinally movable type-moving bars, a number of engaging members movably mounted on each said bar, cam bars adapted to travel through the machine and each equipped with cams for operating the said engaging members, controlling bars extending through the machine and each adapted to bring a certain engaging member into its engaging position with the aid of a said cam, keys each adapted to operate a plurality of the said controlling bars, and shifting members adapted to engage with the operated engaging members and to shift their type moving bars into positions corresponding to the keys operated.

26. In a writing machine, types, longitudinally movable type-moving bars, a number of engaging members movably mounted on each said bar, cam bars adapted to travel through the machine and each equipped with cams for operating the said engaging members, rocking arms at the sides of the machine, controlling bars extending through the machine from one said rocking arm to another and each adapted to bring a certain engaging member into its engagaing position with the aid of a said cam, keys each adapted to operate a plurality of the said controlling bars, and shifting members adapted to engage with the operated engaging members and to shift their type-moving bars into positions corresponding to the keys operated.

27. In a writing machine, types, longitudinally movable type-moving bars, a number of engaging members movably mounted on each said bar, cam bars adapted to travel through the machine and each equipped with cams for operating the said engaging members controlling bars extending through the machine and each adapted to bring a certain engaging member into its engaging position with the aid of a said cam, key bars adapted to be moved lengthwise by the said keys, projections on each of the said key bars for operating a plurality of the said controlling bars, and shifting members adapted to engage with the operated engaging members and to shift their type-moving bars into positions corresponding to the keys operated.

28. In a writing machine, types, longitudinally movable type-moving bars, a number of engaging members movably mounted on each said bar, cam bars adapted to travel through the machine and each equipped with cams for operating the said engaging members, controlling bars extending through the machine and each adapted to bring a certain engaging member into its engaging position with the aid of a said cam, key bars adapted to be moved lengthwise by the said keys, a stepping mechanism for progressively stepping the said cam bars from one type-moving bar to another, a universal bar located at the ends of the said key bars and adapted to operate the stepping mechanism each time a key bar is operated, projections on each of the said key bars for operating a plurality of the said controlling bars, and shifting members adapted to engage with the operated engaging members and to shift their type-moving bars into positions corresponding to the keys operated.

29. In a writing machine, types, longitudinally movably type-moving bars, a number of engaging members movably mounted on each said bar, rigidly interconnected cam bars adapted to travel through the machine, and each equipped with cams for operating the said engaging members, controlling bars extending through the machine and each adapted to bring a certain engaging member into its engaging position with the aid of a said cam, keys each adapted to operate a plurality of the said controlling bars, and shifting members adapted to engage with the operated engaging members and to shift their type-moving bars into positions corresponding to the keys operated.

30. In a writing machine longitudinally movable types, type moving members adapted to move a number of the said types into different positions a number of engaging members attached to each of the said moving members, depressible keys corresponding to types on the typebars, and a transverse bar common to any said type moving members adapted to move the typebars into the printing position.

31. In a writing machine longitudinally movable typebars, depressible keys corresponding to types on the typebars, means for bringing types on different typebars into alignment after the depression of corresponding keys, notches in the typebars, a transverse interlocking bar adapted to enter a notch in each typebar, and means for moving the interlocked typebars into the printing position.

32. In a writing machine, longitudinally movable typebars, depressible keys corresponding to types on the typebars, means for bringing types on different typebars into alignment after the depression of corresponding keys, notches in the typebars, a rocking arm at each side of the machine, a transverse interlocking bar connecting the rocking arms and adapted to enter a notch in each typebar, and means for moving the interlocking typebars into the printing position.

33. In a writing machine, longitudinally movable typebars, depressible keys corresponding to types on the typebars, means for bringing types on different typebars into alignment after the depression of corresponding keys, notches in the typebars, a slide at each side of the machine, a rocking arm mounted in each said slide, a transverse interlocking bar connecting the rocking arm and adapted to interlock the typebars by entering into a notch in each typebar, and means for moving the inter-locked typebars into the printing position.

34. In a writing machine, longitudinally movable typebars, depressible keys corresponding to types on the typebars, means for bringing types on different typebars into alignment after the depression of corresponding keys, notches in the typebars, a rocking arm at each side of the machine, a transverse interlocking bar connecting the rocking arms and adapted to enter a notch in each typebar, a transverse travelling bar for swinging the rocking arms so as to move the interlocking bar into its interlocking position, and means for moving the interlocked typebars into the printing position and for subsequently returning them into their initial positions.

35. In a writing machine, a plurality of movable magazines, loose typebars each having a row of fixed characters with different characters in each magazine, means for moving the magazines into different positions, means for moving any said typebars in one direction out of the magazines and into certain positions, and means for moving said typebars into the magazines in the opposite direction.

36. In a writing machine, typebars, means for imparting to one of the typebars and subsequently to each other motions in coordinate directions, and means for determining the extent of the coordinate motions previous to their execution while the typebar is at rest.

37. In a writing machine, typebars, magazines for sets of typebars, levers for raising and lowering the magazines, and a curved member and a longitudinally movable bar for operating each said lever.

38. In a writing machine longitudinally movable typebars, type moving members with dogs to move any typebars into the printing position, means for bringing any said dogs into an operative position, a moving member for moving any said dog, a motion transferring member for transferring the movement of the dog to its associated typebar, a shift-key, a shifting member for changing the relative positions of the dogs, the motion-transferring member and its typebar when the shift-key is operated, whereby the type of the typebar, that is brought into the printing position, is made to differ from that which is brought into the printing position when the shift-key is not operated, means for restoring the relative positions of the dogs, the motion transferring member and typebars to normal, the restoring means consisting of moving mechanism, a stop for holding the motion-transferring member whilst the dog continues moving, and a spring adapted to act upon the motion-transferring member after the operation of the said stop.

39. In a writing machine, typebars, a type selecting bar associated with each typebar, keys, a transverse bar, for moving the type-selecting bars through different distances, according to the keys operated, motion-transferring bars linked to the said type-selecting bars and adapted to transfer the motion of the type-selecting bars to the typebars, means for imparting reciprocating motion to the said transverse bar, coupling members on the transverse bars, and a second transverse bar, detachably coupled to the first transverse bar when this bar moves the type-selecting bars in a forward direction and adapted to restore these bars to their normal positions and to be detached from the first transverse bar after a short movement in the backward direction.

40. In a writing machine, magazines adapted to be raised and lowered, typebars adapted to be moved to different extents out of the magazines and to be then shifted onto a printing position, racks, a toothed wheel for shifting the said racks, magazine raising means adapted to be operated by one said rack, typebar moving means adapted to be operated by another said rack, and means for shifting the typebars into the printing position and adapted to be operated by a third said rack.

41. In a writing machine, magazines adapted to be raised and lowered, type bars adapted to be moved to different extents out of the magazines and to be then shifted into a printing position, racks, a toothed wheel for shifting the said racks, magazine raising means adapted to be operated by one said rack, typebar moving means adapted to be operated by another said rack, and means for shifting the typebars into the printing position and adapted to be operated by a third said rack, the said racks being arranged side by side.

42. In a writing machine, types, longitudinally movable type moving bars, a number of engaging members attached to each said bar, keys, means controlled by the said keys and adapted to bring any said engaging member into its engaging position, said means being common to a plurality of the said bars and adapted to pass from bar to bar through the machine, and a device for shifting into alignment a plurality of the engaging members, which have been brought into their engaging position.

43. In a writing machine, types, longitudinally movable type-moving bars, a number of swinging dogs on each said bar, keys, means controlled by the said keys and adapted to bring any said dog into an operative position, said means being common to a plurality of the said bars and adapted to pass from bar to bar through the machine, and a device for shifting into alignment a plurality of the dogs which have been brought into their operative position.

44. In a writing machine, types, longitudinally movable type-moving bars, a number of swinging dogs on each said bar, keys, means controlled by said keys and adapted to bring any said dog into an operative position, said means being common to a plurality of the said bars and adapted to pass from bar to bar through the machine, and a transevrse bar extending through the machine and adapted to shift into alignment a plurality of all the dogs which have been brought into their operative position.

45. In a writing machine, longitudinally and laterally movable type bars, longitudinally movable rods for setting the type bars, a number of movable dogs mounted on each said rod, keys, means controlled by the said keys and adapted to bring any said dog into operative position, said means being common to a plurality of the said rods and adapted to pass from rod to rod through the machine, a transverse bar extending through the machine and adapted to shift into alignment a plurality of the dogs which have been brought into their operative positions, and spacing members adapted to be inserted between the laterally movable type bars.

46. In a writing machine, longitudinally and laterally movable type bars of different breadths according to the breadths of their types, longitudinally movable rods for setting the type bars, a number of movable dogs mounted on each said rod, keys, means controlled by the said keys and adapted to bring any said dog into an operative position, said means being common to a plurality of the said rods and adapted to pass from rod to rod through the machine so as to shift into alignment a plurality of the dogs which have been brought into their operative positions, and spacing members adapted to be inserted between the laterally movable type bars.

47. In a writing machine, a plurality of sets of type, each set being arranged upon a number of longitudinally and laterally movable typebars, longitudinally movable rods for setting the type bars, a number of movable dogs mounted on each said rod, keys, means controlled by the said keys and adapted to bring any said dog into an operative position, said means being common to a plurality of the said rods and adapted to pass from rod to rod through the machine, a transverse bar extending through the machine and adapted to shift into alignment a plurality of the dogs which have been brought into their operative positions, and spacing members adapted to be inserted between the laterally movable typebars.

48. In a writing machine, movable magazines, a number of typebars in any magazine, a first row of longitudinally movable bars for moving the magazines into certain positions, and a second row of longitudinally movable bars for shifting typebars out of the said magazines.

49. In a writing machine, movable magazines, a number of typebars in any magazine, a first row of longitudinally movable bars, means for moving the magazines into certain positions, a second row of longitudinally movable bars, other means for shifting typebars out of the said magazines, means for moving the shifting typebars into the printing position, and means for interlocking the typebars against relative longitudinal movement when they are in a printing position.

50. In a writing machine, types, longitudinally movable type moving bars, a number of engaging members attached to each said bar, depressible keys, means controlled by the said keys and adapted to bring any said engaging member into its engaging position, said means being common to a plurality of all the said bars and adapted to pass from one bar to another at each depression of a said key, and a device for shifting into alignment a plurality of the engaging members which have been brought into their engaging position.

51. In a writing machine, types, longitudinally movable type moving bars, a number of engaging members attached to each said bar, keys, means controlled by the said keys and adapted to bring any said engaging member into its engaging position, said means being common to a plurality of the said bars and adapted to pass from bar to bar through the machine, a device for shifting into alignment a plurality of the engaging members which have been brought into their engaging position and for simultaneously shifting a row of types into a printing position, an inking device, and a guide-way for guiding the inking device along the row of types located in the printing position.

52. In a writing machine, movable magazines, a number of typebars in any magazine, a first row of longitudinally movable bars for moving the magazines into certain positions, a second row of longitudinally movable bars, means for shifting typebars out of the said magazines, a platen adapted to be pressed onto the typebars, and guide members for guiding the typebars when moved out of the magazines, the said guide members being movable at the position where the platen is pressed onto the typebars.

53. In a writing machine, longitudinally movable typebars, depressible keys corresponding to types on the typebars, means for bringing types on different typebars into alignment after the depression of corresponding keys, notches in the typebars, and a transverse interlocking bar adapted to enter a notch in each typebar.

54. In a writing machine, typebars, magazines for sets of typebars, levers in combination with a curved member for raising the magazines, and means for moving the levers, said curved member being adapted to produce uniform travel of the magazines when the said lever moving means execute corresponding uniform movements.

55. In a writing machine typebars, magazines for sets of typebars each having a row of fixed characters, means for setting the magazines into certain positions, means for moving the typebars out of the magazines into a printing position, and means for restoring the typebars and magazines into their normal positions.

56. In a writing machine, a shifting device, types, type moving members each adapted to move a number of the said types into different positions, a number of engaging members, attached to each of the said moving members and each adapted to engage singly with the shifting device whereby the shifting device is caused to shift the type moving member into different positions, and means for restoring the engaging members into their normal positions.

57. In a writing machine, typebars, typebar setting members, engaging members associated with the setting members and adapted to determine the positions into which the typebars are to be set, shifting members adapted to cooperate with the said engaging members, restoring members for restoring the said engaging members, and means for temporarily coupling the shifting members and the restoring members.

58. In a writing machine, typebars, magazines for sets of said typebars each having a row of fixed characters, setting means for setting the magazines into different positions and the typebars into a printing position, and operating means for automatically operating the said setting means.

59. In a writing machine, typebars, magazines for said typebars, registers for determining the positions into which the magazines are to be moved, means for operating the magazines, and means for changing the relation between the said operating means and registers.

60. In a writing machine, typebars, setting means for bringing the typebars into the printing position, registers for determining the positions into which the typebars are to be set, and changing means for changing the relation between the said setting means and registers.

61. In a writing machine, types, longitudinally movable bars for determining the positions of the types in a printing line, a number of engaging members movably mounted on each said bar, and a cam bar adapted to travel through the machine and equipped with means for operating the said engaging members.

62. In a machine for composing a line of type, types, type moving means, a member for imparting a movement to the said moving means, and movable stops attached to the said member for determining the positions of any said types in a line of type.

63. In a machine for composing a line of type, movable typebars with rows of type, a plurality of devices for imparting movements to the said typebars, and different sets of stops on the said devices for determining different movements of the said typebars.

64. In a machine for composing a line of type, movable members, a plurality of devices for imparting movements to the said members, and different sets of movable stops on the said devices for determining different movements of the said members.

65. In a machine for composing a line of type, movable typebars each with a row of types, means for moving a said typebar in different directions, and a plurality of stop systems each determining the movement of a plurality of typebars in a said direction.

66. In a machine for composing a line of type, types, type moving means, and different sets of movable members, each provided with a plurality of movable stops for determining the position of any said type in a line of types.

67. In a machine for composing a line of type, typebars each with a row of types, typebar moving means, and a plurality of stop systems for positioning a said type in several steps.

68. In a machine for composing a line of type, typebars each with a row of type, typebar moving means, a plurality of sets of movable members, and stops attached to the said members for positioning the types in several steps.

69. In a machine for composing a line of type, typebars each with a row of type, means for bringing any said type into a line of type, spaces adapted to be inserted between any two words of the line, means for taking an impression from the line of type, and means for simultaneously spacing a plurality of said typebars at certain distances apart from each other immediately after the taking of the impression has occurred.

70. In a machine for composing a line of type, typebars each with a row of type, means for bringing any type on the typebars into a line, means for adjusting the line of type, means for taking an impression from the line of type, and means for simultaneously spacing a plurality of typebars at certain distances apart from each other after the taking of the impression has occurred.

71. In a machine for composing a line of type, type bars each with a row of type, magazines for the typebars, means for bringing any typebar out of the magazine and any type on the typebars into a printing position to form a line, means for adjusting the line of type to take an impression therefrom, and means for spacing the typebars at certain distances apart from each other and for returning them to their places in the magazines after the impression having been taken.

72. In a machine for composing a line of type, typebars each with a row of type, magazines for the typebars, means for bringing any typebar out of the magazine and any type on the typebars into a printing position to form a line, means for adjusting the line of type to take an impression therefrom, and means for simultaneously spacing the typebars at certain distances apart from each other and for returning them to their places in the magazines after the impression having been taken.

73. In a machine for composing a line of type, typebars each with a row of type, magazines for the typebars, means for bringing any typebar out of the magazine and any type on the typebars into a printing position to form a line, means for adjusting the line of type to take an impression therefrom, and means for spacing the typebars at certain distances apart from each other before they are brought back to their places in the magazines after the impression having been taken.

74. In a machine for composing a line of type, typebars each with a row of type, magazines for the typebars, means for bringing in one direction of movement any type bar out of the magazine and any type on the typebars into a printing position to form a line, means for adjusting the line of type to take an impression therefrom, and means for spacing the typebars at certain distances apart from each other and for returning them in the opposite direction of movement to their places in the magazines after the impression having been taken.

75. In a machine for composing a line of type, shiftable members, longitudinally movable members, and a plurality of movable stops attached to each said movable members for determining the positions of any said shiftable members.

76. In a machine for composing a line of type, longitudinally movable typebars, and means for determining the extent of the motion of a typebar previous to its execution while the typebar is at rest.

77. In a writing machine, typebars each with a row of type, means for bringing a type on each of a plurality of typebars into a printing position to form an adjusted line of type, an inking roller adapted to be moved along the line of type, and a platen adapted to be pressed onto the line of type.

78. In a writing machine, typebars each with a row of type, means for bringing a type on each of a plurality of typebars, into a printing position to form an adjusted line of types, spaces, adapted to be inserted between each two word-units, an inking roller adapted to be moved along the line of type, and a platen adapted to be pressed onto the line of type.

WERNER SCHÄFFER.